March 7, 1950     J. F. KENDRICK     2,499,651
MULTIPLE BEARING
Filed Jan. 22, 1945     3 Sheets-Sheet 1
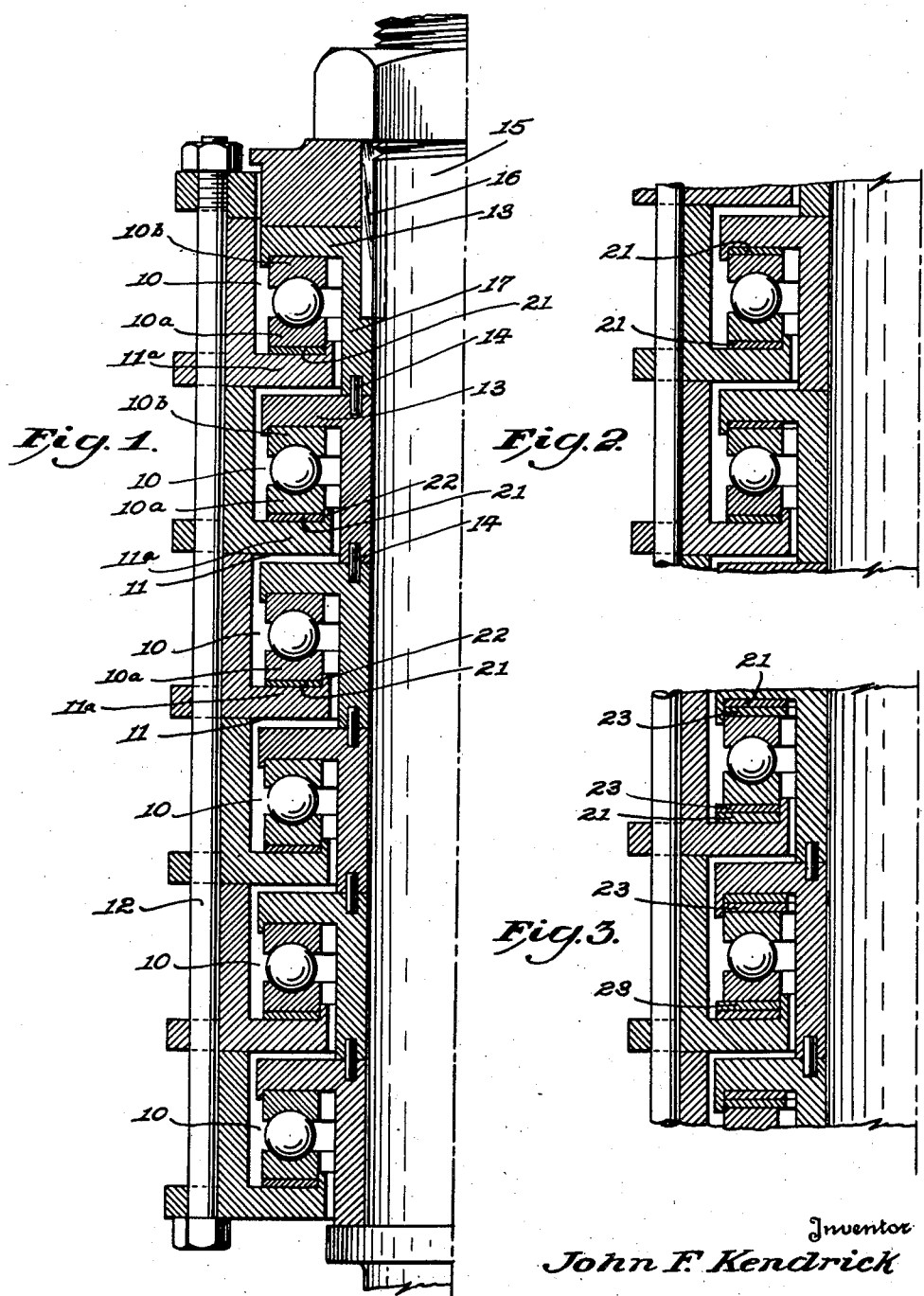

March 7, 1950　　　　J. F. KENDRICK　　　　2,499,651
MULTIPLE BEARING

Filed Jan. 22, 1945　　　　　　　　　　3 Sheets-Sheet 2

Inventor
John F. Kendrick

By

Attorney

March 7, 1950 J. F. KENDRICK 2,499,651
MULTIPLE BEARING
Filed Jan. 22, 1945 3 Sheets-Sheet 3
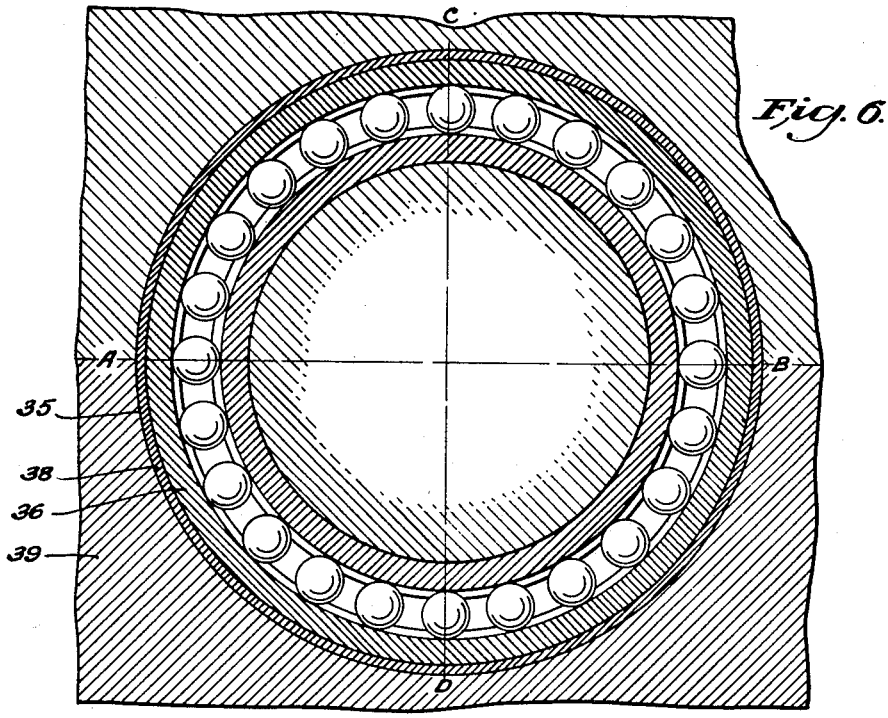
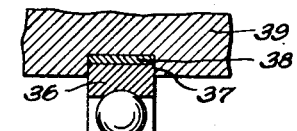
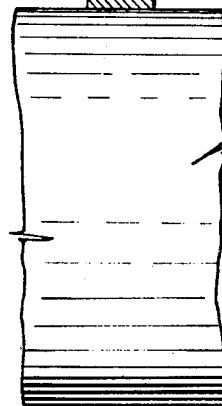
Inventor
John F. Kendrick
By
Attorney

Patented Mar. 7, 1950

2,499,651

UNITED STATES PATENT OFFICE 2,499,651

MULTIPLE BEARING

John F. Kendrick, Columbus, Ohio

Application January 22, 1945, Serial No. 573,949

21 Claims. (Cl. 308—233)

This invention relates to improvements in machine bearings, and has for its object to provide a multiple bearing construction in which the working loads are distributed on the different units of the composite bearing assembly.

It is another object of the invention to provide improved load-equalizing washers for use in bearings arranged in series or parallel order.

In the crude oil industry, the increasing demand for the drilling and producing of deeper wells is making it necessary to carry increasingly heavier loads on both plain and antifriction types of bearings. Such problems are confronted in the design of the tables and water swivels of rotary drills and the supporting element in sucker rod rotating devices, to mention a few typical examples. Other industries, of course, have similar problems. All too frequently, the width of such devices are limited by size and ease of handling or by allowable peripheral speeds. A satisfactory solution of all such problems is found in a practical way to operate bearings disposed in series and/or parallel order.

Heretofore, the operation of bearings in series and/or parallel has been avoided by machine designers because one or two such bearings have been found to carry all the load, due to the practical operation of manufacturing tolerances, unless conditions justify a quality of workmanship resulting in tolerances that will require selective assembly, and considerable final fitting on the assembly floor. Rarely are such manufacturing costs justified, so it is common to encounter more and more seriously overloaded bearings. This results in early and frequent failures in operation, which are costly and in many other ways undesirable.

It is a further object of this invention to provide a practical means for equalizing the load on any type of bearing when operated in series and/or parallel.

It is another object of this invention to equalize the load on bearings operated in series and/or parallel in a simple manner without the use of delicate pressure compensating devices.

It is a further object of this invention to provide means for equalizing the load on bearings, while still making it practical to maintain ordinary commercial tolerances with interchangeable assembly.

It is another object to provide a means for equalizing the load on bearings so operated, with such simple flexibility that it can be adapted easily to a wide range of operating conditions.

It is another object to provide means to make it practical to support great weights on bearings with adequate capacity by equalizing the load on each bearing, thus increasing the safety and reliability of the devices supporting such loads.

It is another object of this invention to make it practical to supply adequate bearing capacity with compactness and reasonable peripheral velocities.

Other objects and advantages of this invention will become apparent from the detailed disclosures contained in the following specification and drawings. This application has been divided in application, Serial No. 733,923, filed March 11, 1947, now abandoned.

In the drawings:

Fig. 1 is a vertical sectional view of a number of thrust bearings of the ball type, arranged in series, and showing a preferred embodiment of this invention;

Fig. 2 is a similar view of a modified form in which a pair of deformable washers is utilized in each complete bearing unit;

Fig. 3 is a similar view of another modification in which the deformable washers are formed with reinforcing plates;

Fig. 6 is a sectional view of a standard radial bearing of the ball type, showing diagrammatically the preferred embodiment of this invention applied to standard bearings operated in parallel;

Fig. 7 is a similar view in a plane perpendicular to that of Fig. 6.

Figure 4:
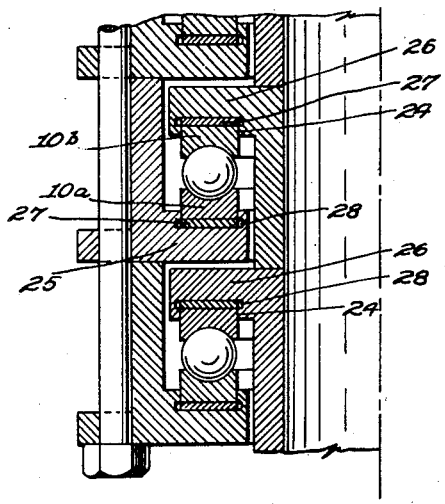
Fig. 4 is a similar view of a further modification in which the bearing seats are formed to limit the deformation of the washers.

In the accompanying drawings, ball bearings have been used for purposes of illustration. It is obvious, however, that the invention can be applied equally effectively to any type of bearing, including standard and thrust, plain, rollered or tapered bearings. The bearing supports and method of assembling the bearings have been indicated diagrammatically, as they are not necessarily a part of this invention; also means for lubrication and closure against dust and oil leakage have been omitted for the sake of simplicity. The features of such details are generally well known in the art and are governed by the nature of the device in which the bearings are to be assembled and operated in series and/or parallel relation.

Referring more particularly to Fig. 1, a plurality of regular thrust bearings, shown at 10, are arranged in series, thus providing a maximum of bearing capacity with the smallest possible overall diameter. The lower bearing races 10a are shown as supported by a plurality of brackets 11, which are held in fixed relationship to each other by the side rods 12. The brackets 11 usually comprise the stationary member of the bearing assembly and may be supported in any suitable manner. The upper bearing races 10b support another series of brackets 13, which make up the revolving element of the assembly. The brackets 13 may be positioned with respect to each other, by any convenient means, such as dowel pins 14. A shaft or spindle 15 is positioned axially with respect to the brackets 13 and pinned or keyed to the uppermost bracket 13 as at 16, so that the shaft and the brackets 13 will rotate together in a unitary manner.

Two factors make it difficult to load the bearings 10 equally in such an assembly. First, there is the normal operation of the manufacturing tolerances which, in the case of one set of bearings, might add, while in the case of another set of such bearings, might subtract. The other factor is that the total load, supported by the bearings, is transmitted to the individual bearings by the columnar risers 17 of the brackets 11 and 13. The compressive stresses are a maximum in the lower of the brackets 11 and the upper of the brackets 13 and a minimum in the upper of the brackets 11 and the lower of the brackets 13. The application of the load from opposed directions to the stationary and revolving members, brings the deflections due to the compression into opposition, further deforms the assembly and results in loading some of the bearings to a greater extent than the others. In an extreme case, one bearing could be forced to carry all the load, and would of course fail quickly in operation.

It will be obvious that by trying to offset these conditions by careful dimensioning and precision manufacture will result in uncertainty with materially increased manufacturing costs.

Figure 5:
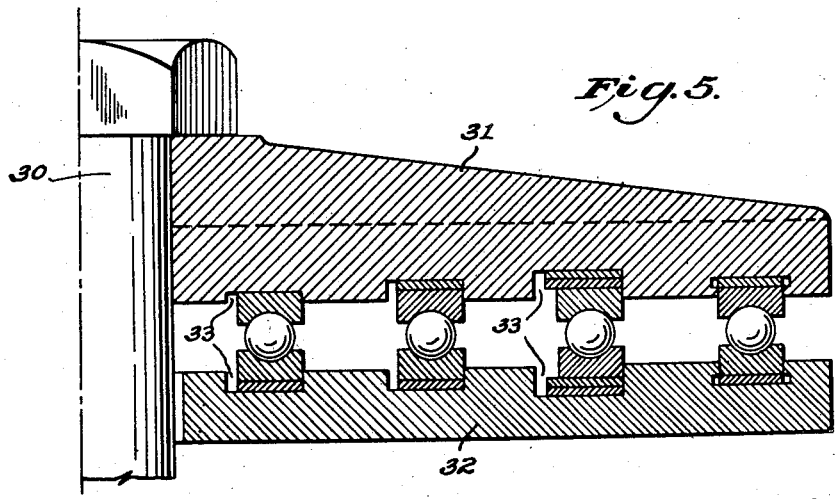
Fig. 5 is a sectional view of a number of thrust bearings, of the ball type, arranged in parallel.

Fig. 5 shows diagrammatically a plurality of thrust bearings assembled for operation in parallel. Again, two factors combine to make it difficult to distribute the load proportionately between the different bearings for, in case of parallel operation, the smaller diameter bearing generally has the smallest capacity. As in the case of a series operation of Fig. 1, the manufacturing tolerances may combine in such a way as to load the bearings unsatisfactorily. Also, unless the revolving thrust plate of Fig. 5 and the fixed thrust plate are made unnecessarily heavy or are rigidly supported, they will deflect under the load, with the maximum deflection occurring at the outer perimeter of the bearing. Again, trying to correct this condition with careful dimensioning and precision manufacture, will result in uncertainty and materially increasing manufacturing costs.

In Fig. 1, there is shown a plurality of thrust bearings arranged in series and modified by the introduction of the load-equalizing washers 21 comprising a simple form of the present invention. For each bearing unit, one of these washers is positioned between the lower race 10a and the bracket shelf 11a, the latter being formed inwardly with an upturned flange 22. The supporting area of each of these washers is so proportioned in relation to the compressive yield pressure of its material, that it will flow plastically when subjected to a prescribed pressure. This pressure will be the maximum load the bearing will support for a short time.

It will be apparent that when such load equalizing washers are placed between one of the races of each bearing and its supporting bracket, and a load applied to the assembly that is increased progressively, as the bearings are revolved slowly, the washer under the bearing carrying the greatest proportion of the total load will be squeezed so that it becomes permanently thinner, thus enabling the bearings to move in respect to the bearings next above and below. Because all the bearings are interconnected, by means of the resistance pieces or risers 17, all the bearings above the one most heavily loaded are moved or displaced slightly, which tends to distribute the load partially to the other bearings. As the applied load is progressively increased, the load-equalizing washers 21 are further deformed in proportion to the individual pressure placed upon them, and this continues until the load is automatically equalized amongst all the bearings. At this point, the applied load is in excess of the normal operating load of the assembly, so there will be no further deformation of the equalizing washers when the assembly is operated normally. Should a momentary overload be again applied in operation in excess of the "running in" load, the washers would again be deformed proportionately, and no harm would be done, unless the peak overloads occur with such frequency and magnitude as to completely extrude the equalizing washers.

Under such severe conditions, the modifications of my invention, described in detail hereinafter, are to be preferred. Ordinarily, it will be better machine design to end up with enough excess bearing capacity so there will be no further deformation of the washers in normal operation, as this makes for greater dependability in operation. Consideration will disclose that this procedure automatically compensates for variations in manufacturing tolerances and for elastic deformations resulting from the applied load. As the elastic deformations are apportioned to the applied load, the bearings will be equally loaded even at partial loads.

There exists a wide range of materials from which the load-equalizing washers can be made, including lead, copper, zinc, aluminum and their various alloys, many of which have desirable properties of age and work hardening. With such a wide latitude in the selection of bearing types, sizes, washer material and design, the preferred embodiment of this invention can be expected to cope successfully under virtually all practical conditions encountered. Under some conditions, it will be undesirable to make the corrections to equalize the pressures on the bearings in one direction, as is the case with the preferred embodiment. Such conditions might occur in a very long assembly, or when the combination of the manufacturing tolerances might be expected to differ materially in the fixed assembly and in the rotating assembly. Under such conditions, the modification shown in Fig. 2 can be used advantageously. In this form of my invention, the load compensating washers 21 are placed between both the upper and lower races of each bearing unit and their respective supporting brackets.

Under certain special conditions, it may be necessary to use a bearing with an extremely narrow race compared to its load-carrying capacity. In such cases, it is often advisable to use a load-distributing plate 23 between the bearing race and the load-equalizing washer. Two of these may be used as shown in Fig. 3 or but one of the washers for each unit.

When the applied load is pulsating in character, it will frequently be desirable to use a construction that will arrest the deformation of the load-equalizing washers or bodies after corrections have been automatically made for variations in manufacturing tolerances and the elastic deformation due to the average or some part of the pulsating applied load. Such a construction has been shown in Fig. 4. Here, the bearing races 10a and 10b are set in recesses 24 provided in the horizontal flanges 25 and 26 of the outer housing or boxing rings and the inner shaft rings, respectively, and the load-equalizing washers 27 are confined in these recesses between said races and flanges.

Recesses 24 normally possess greater width or area than the washers 27, thereby providing spaces 28 into which the material of the load-equalizing washers may be crowded when said washers are subjected to deforming loads. Once these spaces are filled by the deformation of the washers flowing into the same, further deformation of the washers will be arrested, as the bearing races fit tightly into the recesses 24 so that the load pressures will not be sufficient to extrude the metal of said washers between the bearing races and the walls of the recesses.

In Fig. 5, there has been shown a multiple thrust bearing whereing the load is adapted to be applied parallel to the axis of the shaft shown at 30, and wherein the load is absorbed by a plurality of bearing units, here shown as being of the ball type, arranged in parallel order, instead of the serial form disclosed in Fig. 1. What has been said in reference to the constructions disclosed in the previously described figures of the drawings applies equally well to the construction disclosed in Fig. 5. However, there is an added complication when bearings are operated in parallel, for generally the smaller diameter bearing units have a lower load capacity than the bearing units of larger diameter, and should be loaded proportionately less. This is not the case with bearings operated in series, as each has the same load capacity, and it is only necessary to equalize the load.

A practical solution of this problem in parallel bearings is to design or form the load-equalizing washers from the smallest diameter to the largest diameter by using different materials, if necessary, possessing different degrees of deformation under a given pressure load, so that each washer will support its proportionate share of the total load. The end result, after the bearing assembly has been initially "run in," is that the bearings would not be arranged in parallel on the same plane, but would be arranged in parallel in steps, with the inside or smaller bearing unit slightly lower than the next outside bearing unit, and so on through the series.

For simplicity in illustration, there has been disclosed in Fig. 5 each type of deformable washer construction as has been separately shown in Figs. 1 to 4, inclusive. It will be understood, however, that the washers may be all of the same type, or one or more of such types in a single bearing structure in which the bearing units are arranged in parallel order for the reception of thrusts imparted parallel to the axis of the shaft 30. The latter has been shown as being provided with an upper head 31 fixed to rotate with the shaft, and maintained in spaced relation from a lower stationary head 32 by the annular ball bearing units arranged in concentric parallel order. The complemental faces of the heads 31 and 32 are recessed as at 33 to receive the deformable washers and the ball-separated races of the bearing units.

Somewhat different problems are presented in the operation of standard radial or journal bearings arranged in parallel. This is illustrated in Figs. 6 and 7, in which the numeral 35 designates a standard radial bearing in its entirety. An outstanding characteristic of such bearings is that the pressure is not uniform throughout the load-bearing half of the bearing unit. When the bearing is not in operation, or not revolving, the pressure at the ends of the horizontal diameter, indicated at A—B, is zero or a minimum, while it is a maximum at the lower end of the vertical diameter C—D. When the bearing is in operation, these points may be displaced angularly due to the direction of the applied forces.

Frequently, a semicircular load-equalizing washer could be applied in one of the ways described in connection with the previously defined forms of the invention, but this would allow an undesirable clearance around the upper half of the bearing race. The solution of this problem is to be found in setting the outer bearing race 36 in a recess 37 with a circular load-equalizing washer 38 disposed between the outer bearing race and the bearing housing 39. Then under excessive loads, the washer 38 will flow plastically, the excess material under the loaded half of the bearing flowing into and filling the excess space above the unloaded half of the bearing. It is obvious that this construction can be combined readily with self-aligning bearings, well known in the art, where the self-aligning bearing would automatically adjust itself to changing axial deflections, and the load-equalizing washer would compensate for variations in manufacturing tolerances and the elastic deformation of the parts.

From the foregoing, it is evident that "running in" bearings equipped with load-equalizing washers form an essential part of the cycle of load-equalization. This simply involves a test stand so that the load can be applied progressively. In many applications, such as in well drilling, the load is applied progressively, and in such practical cases, the initial step of "running in," the bearing could be dispensed with.

Having thus described my invention, I claim:

1. The method of distributing load pressure on composite multiple bearings characterized by an assembly of a plurality of individual bearing units disposed between spaced rotatable and stationary elements, comprising interposing between said bearing units and at least one of the associated elements thereof, bodies plastically deformable, when stressed above their yield pressures, designing said bodies so said yield pressures will occur between the normal rated capacity of said bearing units and the maximum load said bearing units will support for a short time, and progressively increasing the loading pressure applied thereto until such plastic deformation of said bodies is effected as to distribute the total load on the assembly over said bearing units, and thereafter operating said multiple bearing under load pressures below the combined yield pressures, so there will be no further plastic deformation of said bodies.

2. The method of distributing load pressures on composite multiple bearings characterized by an assembly of a plurality of individual bearing units disposed between spaced rotatable and stationary elements, comprising using a sufficient number of said bearing units to insure operation at normal capacity, when total load is distributed over them, interposing between said bearing units and at least one of the associated elements thereof, bodies plastically deformable, when stressed above their yield pressures, designing said bodies so said yield pressures will occur between the normal rated capacity of said bearing units and the maximum load said bearing units will support for a short time, and progressively increasing the loading pressure applied thereto until such plastic deformation of said bodies is effected as to distribute the total load on the assembly over said bearing units, and thereafter operating said multiple bearing under load pressures corresponding to the combined normal capacity of said units, so there will be no further plastic deformation of said bodies.

3. The method of distributing load pressures on composite multiple bearings, characterized by an assembly of a plurality of individual bearing units, arranged in series, disposed between spaced rotatable and stationary elements, comprising interposing between said bearing units and at least one of the associated elements thereof bodies plastically deformable, when stressed above their yield pressures, and applying a load to said assembly until some of said bodies at least are plastically deformed sufficiently to distribute the total load on the assembly over said bearing units.

4. The method of distributing load pressures on composite multiple bearings, characterized by an assembly of a plurality of individual bearing units, arranged in series, disposed between spaced rotatable and stationary elements, comprising interposing between said bearing units and at least one of the associated elements thereof, bodies plastically deformable, when stressed above their yield pressures, and progressively increasing the loading pressure applied thereto until such plastic deformation of said bodies is effected as to distribute the total load on the assembly over said bearing units.

5. The method of distributing load pressures on composite multiple bearings characterized by an assembly of a plurality of individual bearing units, arranged in series, disposed between spaced rotatable and stationary elements, comprising interposing between said bearing units and at least one of the associated elements thereof, bodies plastically deformable, when stressed above their yield pressures, designing said bodies so said yield pressure will occur between the normal rated capacity of said bearing units and the maximum load said bearing units will support for a short time, and progressively increasing the loading pressure applied thereto until such plastic deformation of said bodies is effected as to distribute the total load on the assembly over said bearing units, and thereafter operating said multiple bearing under load pressures below the combined yield pressures, so there will be no further plastic deformation of said bodies.

6. The method of distributing load pressures on composite multiple bearings characterized by an assembly of a plurality of individual bearing units, arranged in series, disposed between spaced rotatable and stationary elements, comprising using a sufficient number of said bearing units to insure operation at normal capacity, when total load is distributed over them, interposing between said bearing units and at least one of the associated elements thereof, bodies plastically deformable, when stressed above their yield pressures, designing said bodies so said yield pressures will occur between the normal rated capacity of said bearing units and the maximum load said bearing units will support for a short time, and progressively increasing the loading pressure applied thereto until such plastic deformation of said bodies is effected as to distribute the total load on the assembly over said bearing units, and thereafter operating said multiple bearing under load pressures corresponding to the combined normal capacity of said units, so there will be no further plastic deformation of said bodies.

7. A multiple bearing assembly, comprising a plurality of bearing units arranged in series and separating associated rotatable and stationary elements, and bodies interposed between said bearing units and at least one of the associated elements thereof, said bodies being plastically deformable when stressed above their yield pressures, so that when a load is applied to said assembly, some of said bodies at least will be plastically deformed sufficiently to distribute the total load on the assembly over said bearing units.

8. A multiple bearing assembly, comprising a plurality of bearing units, arranged in series and separating associated rotatable and stationary elements, and bodies interposed between said bearing units and at least one of the associated elements thereof, said bodies being plastically deformable when stressed above their yield pressures, so that when a load applied to said assembly is progressively increased, some of said bodies at least will be plastically deformed sufficiently to distribute the total load on the assembly over said bearing units.

9. A multiple bearing assembly, comprising a plurality of bearing units, arranged in series and separating associated rotatable and stationary elements, and bodies interposed between said bearing units and at least one of the associated elements thereof, said bodies being plastically deformable when stressed above their yield pressures, said bodes being designed so said yield pressures will occur between the normal rated capacity of said bearing units and the maximum load said bearing units will support for a short time, so that when a load applied to said assembly is progressively increased, some of said bodies at least will be plastically deformed sufficiently to distribute the total load on the assembly over said bearing units, whereby to permit said multiple bearing to be operated thereafter under load pressures below the combined yield pressures, so there will be no further plastic deformation of said bodies.

10. A multiple bearing assembly, comprising a sufficient number of bearing units, arranged in series, to insure operation at normal capacity when total load is distributed over them, said units separating associated rotatable and stationary elements, and bodies interposed between said bearing units and at least one of the associated elements thereof, said bodies being plastically deformable when stressed above their yield pressures, said bodies being designed so said yield pressures will occur between the normal rated capacity of said bearing units and the maximum load said bearing units will support for a short time, so that when a load applied to said assembly is progressively increased, some of said bodies at least will be plastically deformed sufficiently to distribute the total load on the assembly over said bearing units, whereby to permit said multiple bearing to be operated thereafter under load pressures corresponding to the combined normal capacity of said units, so there will be no further plastic deformation of said bodies.

11. The method of distributing load pressures on composite multiple bearings, characterized by an assembly of a plurality of individual thrust bearing units, arranged concentrically in parallel, disposed between spaced rotatable and stationary elements, comprising interposing between said bearing units and at least one of the associated elements thereof bodies plastically deformable, when stressed above their yield pressures, and applying a load to said assembly until some of said bodies at least are plastically deformed sufficiently to distribute the total load on the assembly over said bearing units.

12. The method of distributing load pressures on composite multiple bearings, characterized by an assembly of a plurality of individual thrust bearing units, arranged concentrically in parallel, disposed between spaced rotatable and stationary elements, comprising interposing between said bearing units and at least one of the associated elements thereof, bodies plastically deformable, when stressed above their yield pressures, and progressively increasing the loading pressure applied thereto until such plastic deformation of said bodies is effected as to distribute the total load on the assembly over said bearing units.

13. The method of distributing load pressures on composite multiple bearings characterized by an assembly of a plurality of individual thrust bearing units, arranged concentrically in parallel, disposed between spaced rotatable and stationary elements, comprising interposing between said bearing units and at least one of the associated elements thereof, bodies plastically deformable, when stressed above their yield pressures, designing said bodies so said yield pressures will occur between the normal rated capacity of said bearing units and the maximum load said bearing units will support for a short time, and progressively increasing the loading pressure applied thereto until such plastic deformation of said bodies is effected as to distribute the total load on the assembly over said bearing units, and thereafter operating said multiple bearing under load pressures below the combined yield pressures, so there will be no further plastic deformation of said bodies.

14. The method of distributing load pressures on composite multiple bearings characterized by an assembly of a plurality of individual thrust bearing units, arranged concentrically in parallel, disposed between spaced rotatable and stationary elements, comprising using a sufficient number of said bearing units to insure operation at normal capacity, when total load is distributed over them, interposing between said bearing units and at least one of the associated elements thereof, bodies plastically deformable, when stressed above their yield pressures, designing said bodies so said yield pressures will occur between the normal rated capacity of said bearing units and the maximum load said bearing units will support for a a short time, and progressively increasing the loading pressure applied thereto until such a plastic deformation of said bodies is effected as to distribute the total load on the assembly over said bearing units, and thereafter operating said multiple bearing under load pressures corresponding to the combined normal capacity of said units, so there will be no further plastic deformation of said bodies.

15. A multiple bearing assembly, comprising a plurality of thrust bearing units, concentrically arranged in parallel, separating associated rotatable and stationary elements, and bodies interposed between said bearing units and at least one of the associated elements thereof, said bodies being plastically deformable, when stressed above their yield pressures, so that when a load is applied to said assembly, some of said bodies at least will be plastically deformed sufficiently to distribute the total load on the assembly over said bearing units.

16. A multiple bearing assembly, comprising a plurality of thrust bearing units concentrically arranged in parallel and separating associated rotatable and stationary elements, and bodies interposed between said bearing units and at least one of the associated elements thereof, said bodies being plastically deformable, when stressed above their yield pressures, so that when a load applied to said assembly is progressively increased, some of said bodies at least will be plastically deformed sufficiently to distribute the total load on the assembly over said bearing units.

17. A multiple bearing assembly, comprising a plurality of thrust bearing units, concentrically arranged in parallel for separating associated rotatable and stationary elements, and bodies interposed between said bearing units and at least one of the associated elements thereof, said bodies being plastically deformable when stressed above their yield pressures, said bodies being designed so that their yield points will occur between the normal rated capacity of said bearing units and the maximum load said bearing units will support for a short time, so that when a load applied to said assembly is progressively increased, some of said bodies at least will be plastically deformed sufficiently to distribute the total load on the assembly over said bearing units, whereby to permit said multiple bearing to be operated thereafter under load pressures below the combined yield pressures, so there will be no further plastic deformation of said bodies.

18. A multiple bearing assembly comprising a sufficient number of thrust bearing units, arranged concentrically in parallel, to insure operation at normal capacity, when total load is distributed over them, said units separating associated rotatable and stationary elements and bodies interposed between said bearing units and at least one of the associated elements thereof, said bodies being plastically deformable, when stressed above their yield pressures, said bodies being designed so said yield pressures will occur between the normal rated capacity of said bearing units and the maximum load said bearing units will support for a short time, so that when a load applied to said assembly is progressively increased, some of said bodies, at least, will be plastically deformed sufficiently to distribute the total load on the assembly over said bearing units, whereby to permit said multiple bearing to be operated thereafter under load pressures corresponding to the combined normal capacity of said units, and so there will be no further plastic deformation of said bodies.

19. The method of distributing load pressures on composite multiple bearings characterized by an assembly of a plurality of individual radial bearing units, arranged in parallel, disposed between spaced rotatable and stationary elements, comprising interposing between said bearing units and at least one of the associated elements thereof, bodies plastically deformable, when stressed above their yield pressures, and progressively increasing the loading pressure applied thereto until such plastic deformation of said bodies is effected as to distribute the total load on the assembly over said bearing units.

20. The method of distributing load pressures on composite multiple bearings characterized by an assembly of a plurality of individual radial bearings, arranged in parallel, disposed between spaced rotatable and stationary elements, comprising interposing between said bearing units and at least one of the associated elements thereof, bodies plastically deformable, when stressed above their yield pressures, designing said bodies so said yield pressures will occur between the normal rated capacity of said bearing units and the maximum load said bearing units will support for a short time, and progressively increasing the loading pressure applied thereto until such plastic deformation of said bodies is effected as to distribute the total load on the assembly over said bearing units, and thereafter operating said multiple bearing under load pressures below the combined yield pressures, so there will be no further plastic deformation of said bodies.

21. The method of distributing load pressures on composite multiple bearings characterized by an assembly of a plurality of individual radial bearing units, arranged in parallel, disposed between spaced rotatable and stationary elements, comprising using a sufficient number of said bearing units to insure operation at normal capacity, when total load is distributed over them, interposing between said bearing units and at least one of the associated elements thereof, bodies plastically deformable, when stressed above their yield pressures, designing said bodies so said yield pressures will occur between the normal rated capacity of said bearing units and the maximum load said bearing units will support for a short time, and progressively increasing the loading pressure applied thereto until such plastic deformation of said bodies is effected as to distribute the total load on the assembly over said bearing units, and thereafter operating said multiple bearing under load pressures corresponding to the combined normal capacity of said units, so there will be no further plastic deformation of said bodies.

JOHN F. KENDRICK.

REFERENCES CITED

The following references are of record in the file of this patent:

UNITED STATES PATENTS

| Number | Name | Date |
| --- | --- | --- |
| 1,117,500 | Kingbury | Nov. 17, 1914 |
| 1,121,083 | De Ferranti | Dec. 15, 1914 |
| 1,232,800 | Hess | July 10, 1917 |
| 1,434,855 | Stamm | Nov. 7, 1922 |
| 1,448,189 | Brunner | Mar. 13, 1923 |
| 1,510,814 | Wintroath | Oct. 7, 1924 |
| 1,871,630 | Minor | Aug. 16, 1932 |
| 2,246,588 | Harrall | June 24, 1941 |

FOREIGN PATENTS

| Number | Country | Date |
| --- | --- | --- |
| 400,650 | France | Mar. 15, 1909 |
| 130,803 | Great Britain | Aug. 21, 1918 |
| 27,465 | Great Britain | Aug. 14, 1919 |